United States Patent
Takaku et al.

(10) Patent No.: US 11,754,259 B2
(45) Date of Patent: Sep. 12, 2023

(54) FLUORESCENT PLATE, WAVELENGTH CONVERSION MEMBER, AND LIGHT SOURCE DEVICE

(71) Applicant: NGK SPARK PLUG CO., LTD., Nagoya (JP)

(72) Inventors: Shohei Takaku, Nagoya (JP); Hiroki Yamauchi, Nagoya (JP); Shinji Ban, Nagoya (JP); Hiroki Takeuchi, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 18/000,953

(22) PCT Filed: Jun. 3, 2021

(86) PCT No.: PCT/JP2021/021146
§ 371 (c)(1),
(2) Date: Dec. 7, 2022

(87) PCT Pub. No.: WO2021/251253
PCT Pub. Date: Dec. 16, 2021

(65) Prior Publication Data
US 2023/0220977 A1    Jul. 13, 2023

(30) Foreign Application Priority Data
Jun. 8, 2020  (JP) .................. 2020-099395

(51) Int. Cl.
*F21V 13/00* (2006.01)
*F21V 13/08* (2006.01)
(Continued)

(52) U.S. Cl.
CPC ............... *F21V 13/08* (2013.01); *F21V 3/08* (2018.02); *F21V 7/05* (2013.01); *F21V 9/40* (2018.02);
(Continued)

(58) Field of Classification Search
CPC ... F21V 13/08; F21V 3/08; F21V 9/40; F21V 7/05
See application file for complete search history.

(56) References Cited

U.S. PATENT DOCUMENTS

| | | | | |
|---|---|---|---|---|
| 2009/0066221 A1* | 3/2009 | Schmidt | ............. | C04B 35/6265 313/503 |
| 2014/0332722 A1* | 11/2014 | Pan | .................... | C09K 11/7774 264/21 |
| 2017/0139224 A1* | 5/2017 | Fujii | .................. | C09K 11/7774 |

FOREIGN PATENT DOCUMENTS

JP           5989268 B2    9/2016

OTHER PUBLICATIONS

Japan Patent Office, International Search Report issued in corresponding Application No. PCT/JP2021/021146, dated Jul. 6, 2021.

* cited by examiner

*Primary Examiner* — Gerald J Sufleta, II
(74) *Attorney, Agent, or Firm* — Stites & Harbison PLLC; Jeffrey A. Haeberlin

(57) ABSTRACT

A fluorescent plate including a fluorescent phase which emits fluorescence by excitation light, and a plurality of voids, wherein, in a cross section of the fluorescent plate including cross sections of the voids, voids having an equivalent circle diameter of 0.4 micrometers or greater and 50 micrometers or smaller have a standard deviation in equivalent circle diameter of 1.5 or less.

20 Claims, 5 Drawing Sheets

| | SD (−) | EQUIVALENT CIRCLE DIAM. (micrometers) | AREA RATIO (%) | Luminance (cd/mm²) |
|---|---|---|---|---|
| sample 1 | 1.1 | 3.5 | 8 | 700 |
| sample 2 | 1.5 | 3.9 | 8 | 500 |
| sample 3 | — | — | 8 | 300 |
| sample 4 | 7.4 | 4.3 | 8 | 350 |

(51) Int. Cl.
  *F21V 9/40* (2018.01)
  *F21V 29/83* (2015.01)
  *F21V 7/05* (2006.01)
  *F21V 3/08* (2018.01)
  *F21Y 115/10* (2016.01)
  *F21Y 115/30* (2016.01)
(52) U.S. Cl.
  CPC ........... *F21V 29/83* (2015.01); *F21Y 2115/10* (2016.08); *F21Y 2115/30* (2016.08)

[Fig.1]
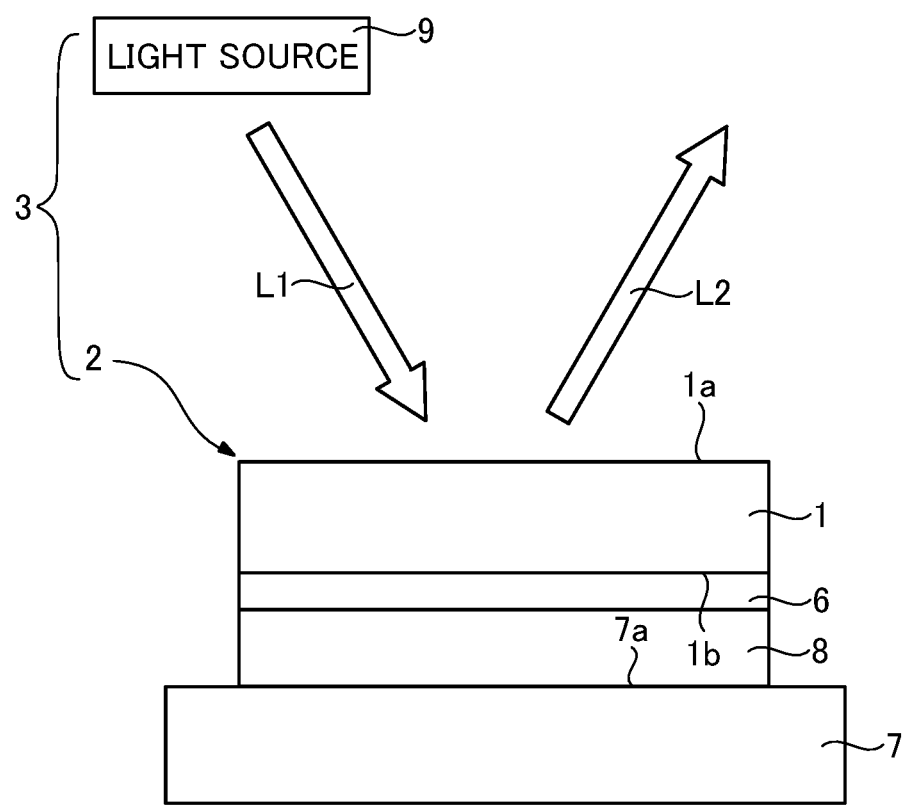

[Fig.2]
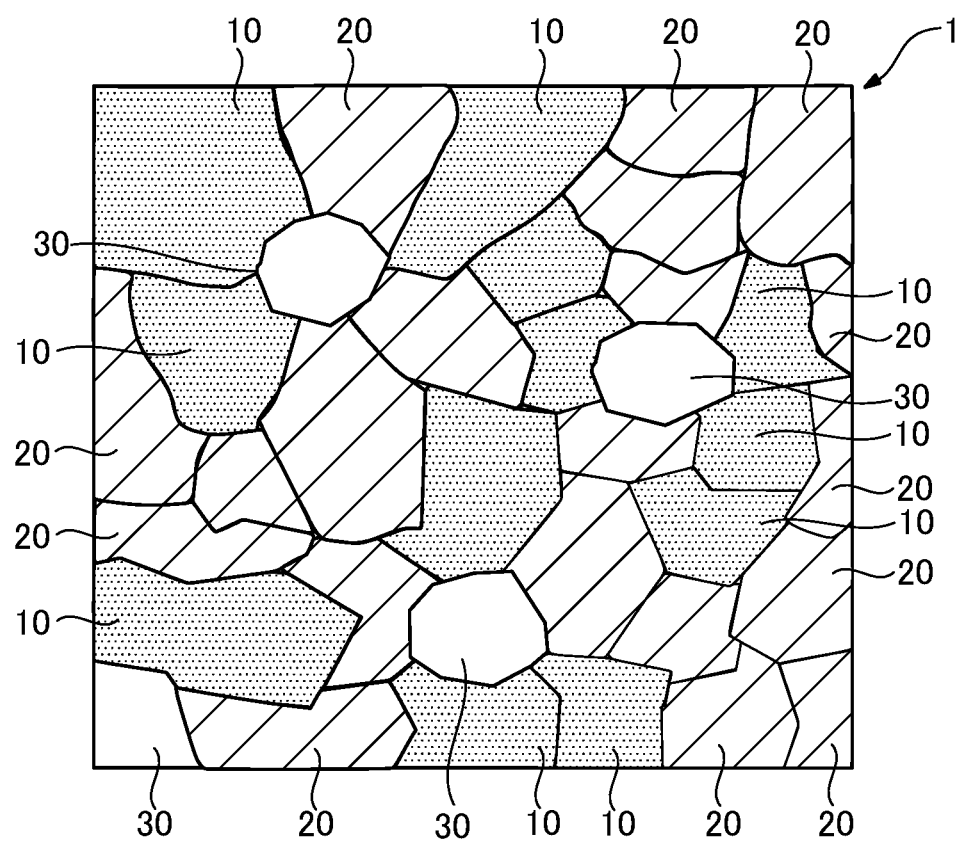

[Fig.3]

|  | SD (-) | EQUIVALENT CIRCLE DIAM. (micrometers) | AREA RATIO (%) | Luminance ($cd/mm^2$) |
|---|---|---|---|---|
| sample 1 | 1.1 | 3.5 | 8 | 700 |
| sample 2 | 1.5 | 3.9 | 8 | 500 |
| sample 3 | — | — | 8 | 300 |
| sample 4 | 7.4 | 4.3 | 8 | 350 |

[Fig.4]

|  | SD (−) | EQUIVALENT CIRCLE DIAM. (micrometers) | AREA RATIO (%) | Luminance (cd/mm$^2$) |
|---|---|---|---|---|
| sample 1 | 1.1 | 3.5 | 8 | 700 |
| sample 5 | 1.3 | 4.2 | 8 | 650 |
| sample 6 | 1.2 | 5.4 | 8 | 600 |
| sample 7 | 1.2 | 1.0 | 8 | 450 |
| sample 8 | 1.3 | 10.0 | 8 | 360 |

[Fig.5]

|  | SD (−) | EQUIVALENT CIRCLE DIAM. (micrometers) | AREA RATIO (%) | Luminance (cd/mm$^2$) |
|---|---|---|---|---|
| sample 1 | 1.1 | 3.5 | 8 | 700 |
| sample 9 | 1.3 | 3.4 | 15 | 680 |
| sample 10 | 1.2 | 3.3 | 3 | 670 |
| sample 11 | 1.3 | 3.5 | 1 | 330 |
| sample 12 | 1.1 | 3.6 | 30 | 280 |

FLUORESCENT PLATE, WAVELENGTH CONVERSION MEMBER, AND LIGHT SOURCE DEVICE

TECHNICAL FIELD

The present invention relates to a fluorescent plate, to a wavelength conversion member, and to a light source device.

BACKGROUND ART

Heretofore, there has been known a fluorescent plate (or screen) which emits fluorescence when being irradiated with light. In recent years, a number of known fluorescent plates have been highly-functionalized. Specifically, some fluorescent plates include a fluorescent phase which emits light having a wavelength different from that of the irradiation light. For example, Patent Document 1 discloses a technique of providing light-reflecting voids in such a fluorescent phase.

PRIOR ART DOCUMENTS

Patent Documents

[Patent Document 1] Japanese Patent No. 5989268

SUMMARY OF THE INVENTION

Problem to be Solved by the Invention

However, for enhancing the light extraction efficiency of the fluorescent plate, there is still room for improvement in the aforementioned background technique. More specifically, the fluorescent plate disclosed in Patent Document 1 includes a plurality of voids having a wide inner diameter distribution from smaller than 3 micrometers and greater than 12 micrometers. When the inner diameter of voids varies, the orientation of light scattering in the voids varies considerably. Thus, the light extraction efficiency of the fluorescent plate may decrease.

Under such circumstances, an object of the present invention is to provide a technique for enhancing the light extraction efficiency of a fluorescent plate.

Means for Solving the Problem

The present invention has been accomplished so as to solve at least part of the above-described problem and can be realized in the following aspects.

(1) In one aspect of the present invention, a fluorescent plate is provided. The fluorescent plate includes a fluorescent phase which emits fluorescence by excitation light, and a plurality of voids, wherein, in a cross section of the fluorescent plate including cross sections of the voids, voids having an equivalent circle diameter (or a circle equivalent diameter) of 0.4 micrometers or greater and 50 micrometers or smaller have a standard deviation in equivalent circle diameter of 1.5 or less.

According to the above configuration, the fluorescent plate includes such voids as having an equivalent circle diameter of 0.4 micrometers or greater and 50 micrometers or smaller have a standard deviation in equivalent circle diameter of 1.5 or less, in a cross section of the fluorescent plate including cross sections of the voids. In other words, in the fluorescent plate, the voids having an equivalent circle diameter of 0.4 micrometers or greater and 50 micrometers or smaller have a relatively small variation in equivalent circle diameter, and voids having almost the same size are present in the fluorescent plate. Thus, variation in reflection of light attributed to the fluorescent phase is further reduced in the voids, and the reflectivity provided by the voids can be enhanced, as compared with the case where the equivalent circle diameter varies considerably. As a result, the light extraction efficiency of the fluorescent plate can be enhanced.

(2) In the fluorescent plate of the above aspect, a ratio of the number of voids having an equivalent circle diameter of 1 micrometer or greater and smaller than 10 micrometers to the number of voids having an equivalent circle diameter of 0.4 micrometers or greater and 50 micrometers or smaller may be 90% or higher. According to this technical feature, in the fluorescent plate, the ratio of the number of voids having an equivalent circle diameter of 1 micrometer or greater and smaller than 10 micrometers to the number of voids having an equivalent circle diameter of 0.4 micrometers or greater and 50 micrometers or smaller is 90% or higher. Thus, variation in reflection of light attributed to the fluorescent phase is further reduced in the voids, and the reflectivity provided by the voids can be further enhanced. As a result, the light extraction efficiency of the fluorescent plate can be further enhanced.

(3) In the fluorescent plate of the above aspect, in a cross section of the fluorescent plate including cross sections of the voids, an area ratio of voids having an equivalent circle diameter of 0.4 micrometers or greater and 50 micrometers or smaller may be 3% or higher and 15% or lower. According to this technical feature, in the fluorescent plate, the cross-sectional area ratio of voids having an equivalent circle diameter of 0.4 micrometers or greater and 50 micrometers or smaller is 3% or higher and 15% or lower. When the relative void area of a cross section of the fluorescent plate is small, the number of reflection is reduced, to thereby lower the reflectivity. In addition, when the relative void area of a cross section of the fluorescent plate is large, the distance between adjacent voids decreases, whereby light reflection repeatedly occurs to thereby promote light attenuation. In the fluorescent plate of the above aspect, occurrence of the above drawbacks is suppressed, to thereby enhance the efficiency of extracting light to the outside of the fluorescent plate.

(4) The fluorescent plate of the above aspect may further include a light-transmitting phase which allows passage of the excitation light. In a cross section of the fluorescent plate including cross sections of the voids, a ratio of the area of the fluorescent phase present in the fluorescent plate to the total area of the fluorescent phase and the light-transmitting phase present in the fluorescent plate may be 95% or lower. In the production of a fluorescent plate, when voids provided through sintering increase, the voids come to have a deformed shape. In such a case, the standard deviation in equivalent circle diameter tends to increase disadvantageously. By virtue of the aforementioned technical feature, the ratio of the area of the fluorescent phase present in the fluorescent plate to the total area of the fluorescent phase and the light-transmitting phase present in the fluorescent plate is 95% or lower. Therefore, sintering proceeds smoothly, to thereby prevent provision of voids. Thus, provision of deformed voids is prevented, whereby a disadvantageous increase in standard deviation in equivalent circle diameter can be suppressed. As a result, a drop in the efficiency of extracting light to the outside of the fluorescent plate can be suppressed.

(5) In another aspect of the present invention, a wavelength conversion member is provided. The wavelength conversion member includes the fluorescent plate, and a reflection member which is attached to the fluorescent plate and which reflects the excitation light and the fluorescence. According to this configuration, the wavelength conversion member possesses a reflection member which reflects the fluorescence emitted from the fluorescent plate and the excitation light. Thus, in the fluorescent plate, light radiating to a direction different from the target direction of radiation is reflected by a reflection plate to the target direction. As a result, a large quantity of light can be radiated from the wavelength conversion member.

(6) The wavelength conversion member of the above aspect may further include a heat radiation member for radiating heat of the fluorescent plate to an outside atmosphere. According to this configuration, the wavelength conversion member possesses a heat radiation member for dissipating heat of the fluorescent plate to an outside atmosphere. Thus, in the fluorescent plate, heat generated at fluorescent emission induced by excitation light can be efficiently dissipated to an outside atmosphere, thereby suppressing quenching, which would otherwise be caused by a rise in temperature of the fluorescent plate. As a result, a drop in quantity of light radiated from the wavelength conversion member can be suppressed.

(7) In still another aspect of the present invention, a light source device is provided. The light source device may include the wavelength conversion member, and a light source which radiates the excitation light to the fluorescent plate. According to this configuration, the light source device possesses a light source which radiates excitation light to the fluorescent plate. When the light source emits excitation light to the fluorescent plate, fluorescence occurs in the fluorescent plate by excitation light. The light including the resultant fluorescence is reflected by the fluorescent phase whose predominant portions face toward the voids, whereby the quantity of light radiated to the outside the fluorescent plate increases. As a result, the light source device can provide enhanced light emission intensity.

Notably, the present invention can be realized in various modes. For example, the present invention may be realized as a method producing a fluorescent plate, a method for producing a wavelength conversion member, a method for producing a light source device, a system including a light source device, a method for regulating a light source device, a computer program for causing a manufacturing apparatus to execute manufacture of a light source device, and other modes.

BRIEF DESCRIPTION OF THE DRAWINGS

FIG. 1 Schematic view of a light source device having a fluorescent plate of a first embodiment.

FIG. 2 Enlarged cross-sectional view of the fluorescent plate.

FIG. 3 Table showing first results of an assessment test of the fluorescent plate of the first embodiment.

FIG. 4 Table showing second results of an assessment test of the fluorescent plate of the first embodiment.

FIG. 5 Table showing third results of an assessment test of the fluorescent plate of the first embodiment.

MODE FOR CARRYING OUT THE INVENTION

First Embodiment

FIG. 1 is a schematic view of a light source device 3 having a fluorescent plate 1 of a first embodiment. When the fluorescent plate 1 of the present embodiment is irradiated with light L1 emitted by a light source 9 (e.g., a light emitting diode (LED) or a semiconductor laser (a laser diode (LD)) belonging to the light source device 3, the fluorescent plate 1 generates florescence having a wavelength different from that of light L1. The fluorescence generated by the fluorescent plate 1 intermingles with light which has not been involved in generation of fluorescence at the fluorescent plate 1, to thereby provide radiation (light L2) toward a specific direction. As shown in FIG. 1, the light source device 3 of the present embodiment is a reflection-type light source device and is used in various types of optical apparatuses such as headlights, lighting equipment, and projectors. The light source device 3 has the aforementioned light source 9 and a wavelength conversion member 2. The wavelength conversion member 2 includes the fluorescent plate 1, a reflection member 6, a heat radiation member 7, and a joint layer 8. For the purpose of illustration, the members are illustrated in FIG. 1 in such a manner that the dimensional relation differs from the actual relation.

The fluorescent plate 1 is a plate-shape member formed of a sintered ceramic material. The fluorescent plate 1 has an incident surface 1a into which the incident light L1 enters, and a backside surface 1b opposite to the incident surface 1a. The fluorescent plate 1 generates fluorescence by the excitation light L1 which enters through the incident surface 1a. During generation of fluorescence, the fluorescent plate 1 generates heat. Detailed description of the fluorescent plate 1 will next be provided.

The reflection member 6 is a thin film mainly formed of silver (Ag) and disposed on the backside surface 1b of the fluorescent plate 1. The reflection member 6 reflects, toward the direction of the incident surface 1a, the light passing through fluorescent plate 1 of the light L1 emitted from the light source 9, and the fluorescence going to the backside surface 1b of the fluorescence generated by the fluorescent plate 1. Notably, the reflection member 6 may be formed of a material having high reflectivity such as silver alloy or aluminum (Al).

The heat radiation member 7 is a plate-shape member formed of a material having a thermal conductivity higher than that of the fluorescent plate 1, such as copper, copper-molybdenum alloy, copper-tungsten alloy, aluminum, or aluminum nitride. The heat radiation member 7 can dissipate heat of the fluorescent plate 1 transferred through the joint layer 8 to an outside atmosphere. Notably, the heat radiation member 7 may be a single-layer member formed of any of the aforementioned materials, or a multi-layer member formed of materials which are identical to or different from one another. In addition, a metal film may be disposed on a fluorescent plate 1 side surface 7a of the heat radiation member 7 so as to enhance adhesion with the joint layer 8.

The joint layer 8 is disposed between the reflection member 6 and the heat radiation member 7 and is formed of gold (Au) and tin (Sn). The joint layer 8 can join the fluorescent plate 1 to the heat radiation member 7 and transfers the heat generated at the fluorescent plate 1 to the heat radiation member 7. Notably, the joint layer 8 may be formed of a material other than gold and tin, and may be formed of a solder of other metals, or a sintered material of a micropowder of, for example, silver or copper (Cu).

FIG. 2 is an enlarged cross-sectional view of the fluorescent plate 1. Next, characteristic features of the fluorescent plate 1 of the present embodiment will be described. As shown in FIG. 2, the fluorescent plate 1 has a fluorescent phase 10, a light-transmitting phase 20, and voids 30.

The fluorescent phase 10 is formed of a plurality of fluorescent crystalline particles. In the present embodiment, the fluorescent crystalline particles have a composition represented by a chemical formula $A_3B_5O_{12}$:Ce (i. e., a garnet-type crystal structure). The formula $A_3B_5O_{12}$:Ce denotes that Ce forms a solid solution with $A_3B_5O_{12}$, and element A is partially substituted by Ce. Each of element A and element B in the chemical formula $A_3B_5O_{12}$:Ce represents at least one element selected from the corresponding element group:

element A: Sc, Y, and lanthanoids (except for Ce) (however, element A may further include Gd); and element B; Al (element B may further include Ga).

Notably, the composition and element type of the fluorescent crystalline particles forming the fluorescent phase 10 are not limited to the aforementioned composition and types of elements. One single fluorescent phase 10 may be formed of fluorescent crystalline particles of a plurality of types.

The light-transmitting phase 20 is formed of a plurality of light-emitting crystalline particles. The light-transmitting crystalline particles have a composition represented by a chemical formula $Al_2O_3$. The light-transmitting phase 20 disposed in the fluorescent plate 1 allows passage of light and also serves as a heat transfer route which can efficiently transfer heat generated upon generation of fluorescence at the fluorescent phase 10 to the heat radiation member 7. The refractive index of the light-transmitting phase 20 is lower than that of the fluorescent phase 10.

The voids 30 are provided such that they are surrounded by the fluorescent phase 10 and the light-transmitting phase 20. As shown in FIG. 2, the fluorescent plate 1 is provided with a plurality of the voids 30. In the present embodiment, voids 30 having an equivalent circle diameter of 0.4 micrometers or greater and 50 micrometers or smaller have a standard deviation in equivalent circle diameter of 1.5 or less, in a cross section of the fluorescent plate 1 including cross sections of the voids 30. Also, the ratio of the number of voids 30 having an equivalent circle diameter of 1 micrometer or greater and smaller than 10 micrometers to the number of voids 30 having an equivalent circle diameter of 0.4 micrometers or greater and 50 micrometers or smaller is 90% or higher. The feature means that a plurality of voids 30 present in the fluorescent plate 1 have a small variation in equivalent circle diameter. This feature results from uniformity in particle size of a pore-forming material and sufficient dispersion of the pore-forming material in the raw material, in the below-mentioned method for producing the fluorescent plate 1. In the present embodiment, the mean equivalent circle diameter of voids 30 falls within a range of 1 micrometer to 10 micrometers. A mean equivalent circle diameter falling within the range is preferred for enhancing the visible light-reflectivity of the voids. The refractive index of the voids 30 is lower than that of the light-transmitting phase 20. That is, the refractive index of the voids 30 is lower than that of the fluorescent phase 10.

Further, in the present embodiment, the area ratio of voids 30 having an equivalent circle diameter of 0.4 micrometers or greater and 50 micrometers or smaller is 3% or higher and 15% or lower, in a cross section of the fluorescent plate 1 including cross sections of the voids 30 as shown in FIG. 2. In other words, in the fluorescent plate 1, voids 30 having an equivalent circle diameter of 0.4 micrometers or greater and 50 micrometers or smaller are present in the fluorescent plate 1 at a volume ratio of 3% or higher and 15% or lower. Also, in the present embodiment, the ratio of the area of the fluorescent phase 10 present in the fluorescent plate 1 to the total area of the fluorescent phase 10 and the light-transmitting phase 20 present in the fluorescent plate 1 is 60%, in a cross section of the fluorescent plate 1 including cross sections of the voids 30. In other words, the portion of the fluorescent plate 1 other than voids 30 is formed of the fluorescent phase 10 at a volume ratio of 60% and the light-transmitting phase 20 at a volume ratio of 40%. The area ratio of the fluorescent phase 10 is preferably 95% or lower, from the viewpoints of smooth proceeding of sintering and prevention of over-formation of voids.

Next, a method for producing the fluorescent plate 1 will be described. In the method for producing the fluorescent plate 1, firstly, $Al_2O_3$, $Y_2O_3$, and $CeO_2$ which are weighed in advance are added with pure water to a ball mill, and the mixture is kneaded and pulverized for 16 hours, to thereby prepare a slurry. The slurry is dried, and the dried product is granulated by means of a spray dryer.

Subsequently, the thus-granulated particles are mixed with a specific amount of a pore-forming material and a specific amount of a binder, and the resultant mixture is kneaded under high shear force by means of a screw kneader, to thereby prepare a ceramic raw material. By virtue of kneading under high shearing force, the pore-forming material is uniformly dispersed without causing aggregation. Thus, an increase in standard deviation in equivalent circle diameter, which would otherwise be caused by aggregation of the pore-forming material, can be prevented. The thus-prepared ceramic raw material is formed into a sheet by means of an extruder, and the sheet is fired at 1,700 degrees Celsius in air for sintering, to thereby yield the fluorescent plate 1.

In the production of a wavelength conversion member 2 including the fluorescent plate 1, a reflection member 6 in the form of a film is formed on the backside 1b of the fluorescent plate 1 through vapor deposition or sputtering of silver. Subsequently, gold-tin solder foil is sandwiched between the heat radiation member 7 and the reflection member 6 as film formed on the fluorescent plate 1, and the stacked body is heated in a reflow furnace under nitrogen or hydrogen. As a result, the fluorescent plate 1 is joined to the heat radiation member 7, whereby the wavelength conversion member 2 is yielded. Notably, instead of use of gold-tin solder foil, joining of the fluorescent plate 1 to the heat radiation member 7 may be performed through application of a gold-tin solder paste.

Further, in the production of a light source device 3 including the wavelength conversion member 2, a light source 9 is set such that an incident surface 1a of the fluorescent plate 1 included in the wavelength conversion member 2 is irradiated with light, to thereby complete packaging of the wavelength conversion member 2 and the light source 9. Thus, the light source device 3 is fabricated.

Next, the fluorescent plate 1 of the present embodiment was assessed by some tests. The details of the tests and the results will be described. In the assessment, a plurality of fluorescent plate samples were prepared. Each sample was irradiated with light, and luminance was measured for each sample, to thereby assess the light extraction efficiency of the sample. The assessment was performed in terms of three characteristics: (i) standard deviation in equivalent circle diameter of voids; (ii) equivalent circle diameter of voids, and (iii) ratio of area of voids to cross-sectional area of fluorescent plate.

In the assessment, sample characteristics were determined through the following procedures.

Equivalent Circle Diameter of Voids

Each sample was cut, and the cut surface was mirror-polished. The thus-provided surface was observed under an FE-SEM. In image analysis by use of WinROOF, a cross-sectional image was taken at five points selected at random. The equivalent circle diameter of voids was determined through an intercept method.

Statistical Variance

Distribution of the equivalent circle diameter of voids determined through the aforementioned intercept method was calculated (vertical axis: occurrence, horizontal axis: equivalent circle diameter). The difference between the value of equivalent circle diameter corresponding to the maximum occurrence and the value of equivalent circle diameter corresponding to 5% occurrence was calculated, and the difference was employed as an index for variance.

Standard Deviation

Standard deviation was calculated from values of the equivalent circle diameter of voids determined through the aforementioned intercept method.

Void Area Ratio

A cross-sectional image of each sample was binarized through image processing. In the thus-obtained image, the total area of a plurality of voids and the area of the portion other than the voids were calculated, whereby the ratio of the total area of a plurality of voids to the area of the entire cross-sectional image was calculated.

Luminance

Each sample was ground to a thickness of 200 micrometers, and a surface of the sample was mirror-polished, to thereby prepare a luminance measurement sample. The luminance measurement sample was irradiated with laser light (wavelength: 450 nm, beam diameter: 0.4 mm, and output: 5 W). The luminance of the light toward the reflection direction was measured by means of a luminance meter.

FIG. 3 is a table showing first results of an assessment test of the fluorescent plate 1 of the first embodiment. FIG. 4 is a table showing second results of an assessment test of the fluorescent plate 1 of the first embodiment. FIG. 5 is a table showing third results of an assessment test of the fluorescent plate 1 of the first embodiment. The results of the assessment in terms of the aforementioned three characteristics will next be described.

(i) Standard Deviation in Equivalent Circle Diameter of Voids

Samples for assessment were prepared through a method almost equivalent to the aforementioned method for producing the fluorescent plate 1. Specifically, $Al_2O_3$, $Y_2O_3$, and $CeO_2$ were weighed so that the fluorescent phase ratio of one sample was adjusted to 60 vol %, and the particle size distribution of the pore-forming material to be incorporated into granulated particles was modified as appropriate, whereby ceramic raw materials of samples 1, 2, and 4 were prepared. A ceramic raw material of sample 3 was prepared in the same manner, but no pore-forming material was added. FIG. 3 shows test results on standard deviation in equivalent circle diameter of voids. In the table of FIG. 3, sample 1 was a sample simulating the fluorescent plate 1 of the present embodiment and was employed as a reference sample of the present assessment. As shown in FIG. 3, when the standard deviation was 1.5 or less, a luminance of 500 cd/mm$^2$ or higher was achieved. In contrast, sample 3 having no voids and sample 4 exhibiting a standard deviation of 7.4 were found to provide a luminance of 350 cd/mm$^2$ or lower.

(ii) Equivalent Circle Diameter of Voids

Samples for assessment were prepared through a method almost equivalent to the aforementioned method for producing the fluorescent plate 1. Specifically, samples 5 to 8 were prepared by modifying the particle size distribution of the pore-forming material. FIG. 4 shows test results on equivalent circle diameter of voids. Sample 1 shown in the table of FIG. 4 is the same as the reference sample shown in FIG. 3. As shown in FIG. 4, when the equivalent circle diameter of voids was 1.0 micrometer or 10 micrometers, the luminance was found to be as relatively low as 450 cd/mm$^2$ (1.0 micrometer) and 360 cd/mm$^2$ (10.0 micrometers). In contrast, when the equivalent circle diameter of voids was greater than 1.0 micrometer and smaller than 10 micrometers (3.5 micrometers, 4.2 micrometers, and 5.4 micrometers), the luminance was found to be as relatively high as 600 cd/mm$^2$ or higher.

(iii) Cross-Sectional Void Area Ratio of Cross Section of Fluorescent Plate

Samples for assessment were prepared through a method almost equivalent to the aforementioned method for producing the fluorescent plate 1. Specifically, samples 9 to 12 were prepared by modifying the amount of the pore-forming material added. FIG. 5 shows test results on the area ratio of voids in a cross section of the fluorescent plate. Sample 1 shown in the table of FIG. 5 is the same as the reference sample shown in FIG. 3. As shown in FIG. 5, when the void area ratio was 1% or 30%, the luminance was found to be as relatively low as 330 cd/mm$^2$ (1%) and 280 cd/mm$^2$ (30%). In contrast, when the void area ratio was 3% or higher and 15% or lower (3%, 8%, and 15%), the luminance was found to be as relatively high as 670 cd/mm$^2$ or higher.

As described hereinabove, according to the fluorescent plate 1 of the present embodiment, the voids 30 of the fluorescent plate 1 having an equivalent circle diameter of 0.4 micrometers or greater and 50 micrometers or smaller have a standard deviation in equivalent circle diameter of 1.5 or less, in a cross section of the fluorescent plate 1 including cross sections of the voids 30. In other words, in the fluorescent plate 1, the voids 30 having an equivalent circle diameter of 0.4 micrometers or greater and 50 micrometers or smaller have a relatively small variation in equivalent circle diameter, and voids 30 having almost the same size are present in the fluorescent plate 1. Thus, variation in reflection of light attributed to the fluorescent phase 10 is further reduced in the voids 30, and the reflectivity provided by the voids 30 can be enhanced, as compared with the case where the equivalent circle diameter of the voids 30 varies considerably. As a result, the light extraction efficiency of the fluorescent plate 1 can be enhanced.

According to the fluorescent plate 1 of the present embodiment, in the fluorescent plate 1, the ratio of the number of voids 30 having an equivalent circle diameter of 1 micrometer or greater and smaller than 10 micrometers to the number of voids 30 having an equivalent circle diameter of 0.4 micrometers or greater and 50 micrometers or smaller is 90% or higher. Thus, variation in reflection of light attributed to the fluorescent phase 10 is further reduced in the voids 30, and the reflectivity provided by the voids 30 can be further enhanced. As a result, the light extraction efficiency of the fluorescent plate 1 can be further enhanced.

According to the fluorescent plate 1 of the present embodiment, in the fluorescent plate 1, the cross-sectional area ratio of voids 30 having an equivalent circle diameter of 0.4 micrometers or greater and 50 micrometers or smaller is 3% or higher and 15% or lower. When the relative void area of a cross section of the fluorescent plate is small, the number of reflections is reduced, to thereby lower the reflectivity. In addition, when the relative void area of a cross section of the fluorescent plate is large, the distance between adjacent voids decreases, whereby light reflection repeatedly occurs to thereby promote light attenuation. In the fluorescent plate 1 of the present embodiment, occurrence of the above drawbacks are suppressed, to thereby enhance the efficiency of extracting light to the outside of the fluorescent plate 1.

In the production of a fluorescent plate, when voids provided through sintering increase, the voids come to have a deformed shape. In such a case, the standard deviation in equivalent circle diameter tends to increase disadvantageously. According to the fluorescent plate 1 of the present embodiment, in a cross section including cross sections of the voids 30 the ratio of the area of the fluorescent phase 10 present in the fluorescent plate 1 to the total area of the fluorescent phase 10 and the light-transmitting phase 20 present in the fluorescent plate 1 is 60%. Therefore, sintering proceeds smoothly in the fluorescent plate 1 of the present embodiment, to thereby prevent provision of voids. Thus, provision of deformed voids is prevented, whereby a disadvantageous increase in standard deviation in equivalent circle diameter can be suppressed. As a result, a drop in the efficiency of extracting light to the outside of the fluorescent plate 1 can be suppressed.

According to the wavelength conversion member 2 of the present embodiment, the wavelength conversion member 2 includes a reflection member 6 which reflects the fluorescence emitted from the fluorescent plate 1 and the excitation light. According to this configuration, as shown in, for example, FIG. 1, in the fluorescent plate 1, light radiating to a direction different from the direction of light L2 is reflected by the reflection member 6 toward the target direction. As a result, a large quantity of light can be radiated from the wavelength conversion member 2.

According to the wavelength conversion member 2 of the present embodiment, the wavelength conversion member 2 possesses a heat radiation member 7 for dissipating heat of the fluorescent plate 1 to an outside atmosphere. Thus, in the fluorescent plate 1, heat generated at fluorescent emission induced by excitation light can be efficiently dissipated to an outside atmosphere, thereby suppressing quenching, which would otherwise be caused by a rise in temperature of the fluorescent plate 1. As a result, a drop in quantity of light radiated from the wavelength conversion member 2 can be suppressed.

According to the light source device 3 of the present embodiment, the light source device 3 has a light source 9 which radiates light L1 to the fluorescent plate 1. When the light source 9 emits light L1 to the fluorescent plate 1, fluorescence is generated in the fluorescent plate 1 by a certain light component of light L1. The fluorescence emitted by fluorescent plate 1 is reflected by the fluorescent phase 10 whose predominant portions face toward the voids 30, whereby the quantity of light radiated to the outside the fluorescent plate 1 increases. As a result, the light source device 3 can provide enhanced light emission intensity.

<Modifications of the Present Embodiment>

The present invention is not limited to the above-described embodiment and can be practiced in various forms without departing from the gist of the invention, and, for example, the following modifications are possible.

[Modification 1]

In the aforementioned embodiment, the ratio of the number of voids 30 having an equivalent circle diameter of 1 micrometer or greater and smaller than 10 micrometers to the number of voids 30 having an equivalent circle diameter of 0.4 micrometers or greater and 50 micrometers or smaller is 90% or higher. However, the ratio of the number of voids 30 having an equivalent circle diameter of 1 micrometer or greater and smaller than 10 micrometers not limited to the value, and the ratio may be less than 90%. The standard deviation in equivalent circle diameter of voids having an equivalent circle diameter of 0.4 micrometers or greater and 50 micrometers or smaller may be 1.5 or less.

[Modification 2]

In the aforementioned embodiment, in a cross section of the fluorescent plate 1 including cross sections of the voids 30, the cross-sectional area ratio of voids 30 having an equivalent circle diameter of 0.4 micrometers or greater and 50 micrometers or smaller is 3% or higher and 15% or lower. However, the cross-sectional area ratio of voids 30 having an equivalent circle diameter of 0.4 micrometers or greater and 50 micrometers or smaller is not limited to the value, and the ratio may be lower than 3% or higher than 15%. When the number of voids is excessively small, the effect of reflection becomes small, whereas when the number of voids is excessively large, light reflection repeatedly occurs to cause light attenuation, thereby reducing light reflectivity. Therefore, the cross-sectional area ratio is preferably 3% or higher and 15% or lower.

[Modification 3]

According to the aforementioned embodiment, in a cross section of the fluorescent plate 1 including cross sections of the voids 30, the ratio of the area of the fluorescent phase 10 present in the fluorescent plate 1 to the total area of the fluorescent phase 10 and the light-transmitting phase 20 present in the fluorescent plate 1 is 60%. When the area ratio of fluorescent phase 10 is less than 10% or higher than 95%, sufficient sinterability to form a sintered body fails to be attained, and voids other than the voids provided by the intentionally added pore-forming material tend to be provided. When such unintentional voids increase, provision of deformed voids is promoted, whereby a disadvantageous increase in standard deviation in equivalent circle diameter of the voids 30 may occur. Therefore, the area ratio of the fluorescent phase 10 is preferably 10% or higher and 95% or lower, from the viewpoint of prevention of provision of unintentional voids to a maximum extent during sintering to form the fluorescent plate 1.

[Modification 4]

According to the aforementioned embodiment, the light source device 3 is a reflection-type light source device. However, the fluorescent plate 1 may be applied to a transmission-type light source device.

Although the present aspects have been described on the basis of embodiments and modifications, the above-described embodiments of the aspects is provided so as to facilitate the understanding of the present aspects and does not limit the present aspect. The present aspects can be changed or improved without departing from the purpose of the aspects and the claims, and encompasses equivalents thereof. Also, the technical feature(s) may be eliminated as appropriate unless the present specification mentions that the technical feature(s) is mandatory.

DESCRIPTION OF SYMBOLS

1: fluorescent plate
2: wavelength conversion member
3: light source device
6: reflection member
7: heat radiation member
8: joint layer
9: light source
10: fluorescent phase
20: light-transmitting phase
30: voids

What is claimed is:

1. A fluorescent plate comprising:
   a fluorescent phase which emits fluorescence by excitation light, and
   a plurality of voids, wherein,
   in a cross section of the fluorescent plate including cross sections of the voids, voids having an equivalent circle diameter of 0.4 micrometers or greater and 50 micrometers or smaller have a standard deviation in equivalent circle diameter of 1.5 micrometers or less.

2. The fluorescent plate according to claim 1,
   wherein a ratio of the number of voids having an equivalent circle diameter of 1 micrometer or greater and smaller than 10 micrometers to the number of voids having an equivalent circle diameter of 0.4 micrometers or greater and 50 micrometers or smaller is 90% or higher.

3. The fluorescent plate according to claim 1,
   wherein, in a cross section of the fluorescent plate including cross sections of the voids, an area ratio of voids having an equivalent circle diameter of 0.4 micrometers or greater and 50 micrometers or smaller is 3% or higher and 15% or lower.

4. The fluorescent plate according to claim 1, further comprising a light-transmitting phase which allows passage of the excitation light,
   wherein, in a cross section of the fluorescent plate including cross sections of the voids, a ratio of an area of the fluorescent phase present in the fluorescent plate to a total area of the fluorescent phase and the light-transmitting phase present in the fluorescent plate is 95% or lower.

5. A wavelength conversion member comprising:
   the fluorescent plate as recited in claim 1, and
   a reflection member which is attached to the fluorescent plate and which reflects the excitation light and the fluorescence.

6. The wavelength conversion member according to claim 5, further comprising a heat radiation member for radiating heat of the fluorescent plate to an outside atmosphere.

7. A light source device comprising:
   the wavelength conversion member as recited in claim 5, and
   a light source which radiates light to the fluorescent plate.

8. The fluorescent plate according to claim 2,
   wherein, in a cross section of the fluorescent plate including cross sections of the voids, an area ratio of voids having an equivalent circle diameter of 0.4 micrometers or greater and 50 micrometers or smaller is 3% or higher and 15% or lower.

9. The fluorescent plate according to claim 2, further comprising a light-transmitting phase which allows passage of the excitation light,
   wherein, in a cross section of the fluorescent plate including cross sections of the voids, a ratio of an area of the fluorescent phase present in the fluorescent plate to a total area of the fluorescent phase and the light-transmitting phase present in the fluorescent plate is 95% or lower.

10. The fluorescent plate according to claim 3, further comprising a light-transmitting phase which allows passage of the excitation light,
    wherein, in a cross section of the fluorescent plate including cross sections of the voids, a ratio of an area of the fluorescent phase present in the fluorescent plate to a total area of the fluorescent phase and the light-transmitting phase present in the fluorescent plate is 95% or lower.

11. The fluorescent plate according to claim 8, further comprising a light-transmitting phase which allows passage of the excitation light,
    wherein, in a cross section of the fluorescent plate including cross sections of the voids, a ratio of an area of the fluorescent phase present in the fluorescent plate to a total area of the fluorescent phase and the light-transmitting phase present in the fluorescent plate is 95% or lower.

12. A wavelength conversion member comprising:
    the fluorescent plate as recited in claim 2, and
    a reflection member which is attached to the fluorescent plate and which reflects the excitation light and the fluorescence.

13. A wavelength conversion member comprising:
    the fluorescent plate as recited in claim 3, and
    a reflection member which is attached to the fluorescent plate and which reflects the excitation light and the fluorescence.

14. A wavelength conversion member comprising:
    the fluorescent plate as recited in claim 4, and
    a reflection member which is attached to the fluorescent plate and which reflects the excitation light and the fluorescence.

15. A wavelength conversion member comprising:
    the fluorescent plate as recited in claim 8, and
    a reflection member which is attached to the fluorescent plate and which reflects the excitation light and the fluorescence.

16. A wavelength conversion member comprising:
    the fluorescent plate as recited in claim 9, and
    a reflection member which is attached to the fluorescent plate and which reflects the excitation light and the fluorescence.

17. A wavelength conversion member comprising:
    the fluorescent plate as recited in claim 10, and
    a reflection member which is attached to the fluorescent plate and which reflects the excitation light and the fluorescence.

18. A wavelength conversion member comprising:
    the fluorescent plate as recited in claim 11, and
    a reflection member which is attached to the fluorescent plate and which reflects the excitation light and the fluorescence.

19. The wavelength conversion member according to claim 12, further comprising a heat radiation member for radiating heat of the fluorescent plate to an outside atmosphere.

20. A light source device comprising:
    the wavelength conversion member as recited in claim 6, and
    a light source which radiates light to the fluorescent plate.

* * * * *